F. J. WOOD.
PROCESS OF RECOVERING SALT FROM BRINE.
APPLICATION FILED DEC. 26, 1912.
1,152,777.
Patented Sept. 7, 1915.
2 SHEETS—SHEET 1.
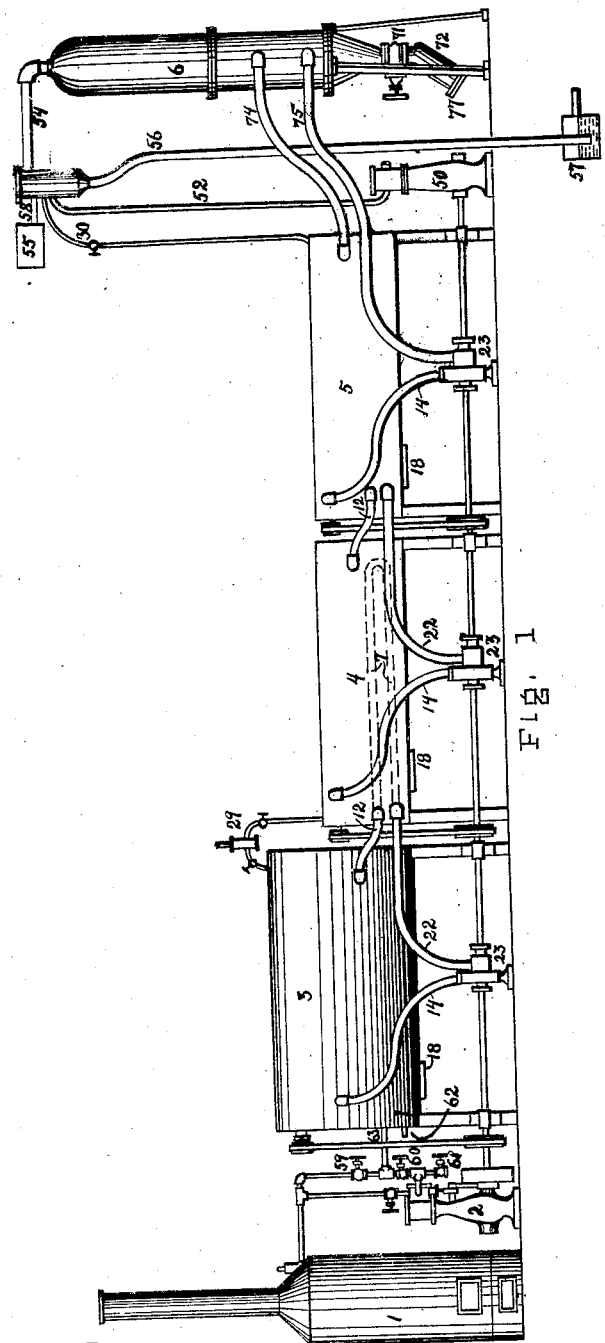
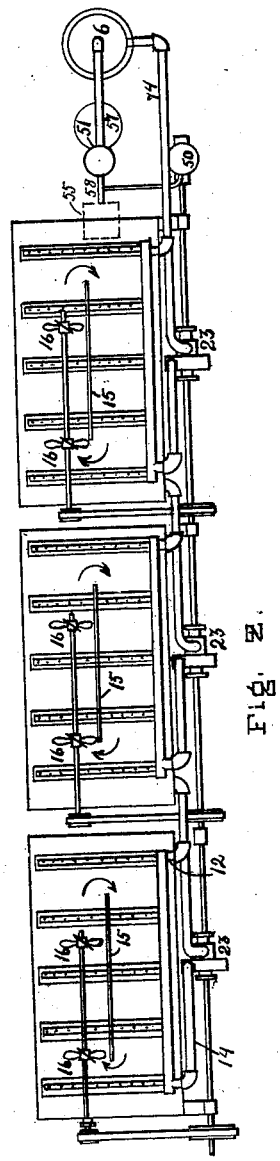
Witnesses:
Charles Ragge
Michael Walsh
Inventor.
Frank J. Wood F. J. WOOD.
PROCESS OF RECOVERING SALT FROM BRINE.
APPLICATION FILED DEC. 26, 1912.

1,152,777.

Patented Sept. 7, 1915.
2 SHEETS—SHEET 2.

Witnesses:
Charles Rage
Michael Walsh

Inventor,
Frank J. Wood

UNITED STATES PATENT OFFICE.

FRANK J. WOOD, OF NEW YORK, N. Y., ASSIGNOR TO WOOD APPARATUS COMPANY, OF NEW YORK, N. Y., A CORPORATION OF NEW YORK.

PROCESS OF RECOVERING SALT FROM BRINE.

1,152,777.

Specification of Letters Patent.

Patented Sept. 7, 1915.

Application filed December 26, 1912. Serial No. 738,708.

*To all whom it may concern:*

Be it known that I, FRANK J. WOOD, a citizen of the United States, residing in the city of New York, State of New York, have invented a certain new and useful Improved Process of Recovering Salt from Brine, of which the following is a specification.

In the recovery of salt from aqueous solutions such as spring water or sea water it may be desired to produce the salt in large or small grains, as each kind is of value in certain uses. For the production of large grains the generally accepted method is to evaporate the brine in large shallow open pans suitably heated, as by steam pipes. The surface being thus open to the air rapid evaporation is effected at a temperature below the boiling point of the brine. As evaporation occurs wholly at the surface and there is no agitation, no bubbles of vapor rise through the liquid and in consequence the precipitation is in the form of large crystals. When, however, the evaporation is effected in a closed pan and the brine is agitated, bubbles rise through the liquid. In consequence the salt precipitation is in the form of small grains.

The object of my invention is a process capable of providing both large and small grains in one apparatus, one or the other kind being obtained according to the temperature and pressures employed.

In brief I employ a modification of the open pan without agitation and a multiple effect evaporating principle by which the heat from one evaporation is conducted to succeeding evaporators to there constitute the heating agent. I effect greater economy in the heat used in the production of the large and small grain salts than has heretofore been accomplished and the consequent saving of fuel necessary to evaporate a given quantity of brine.

Figure 3:
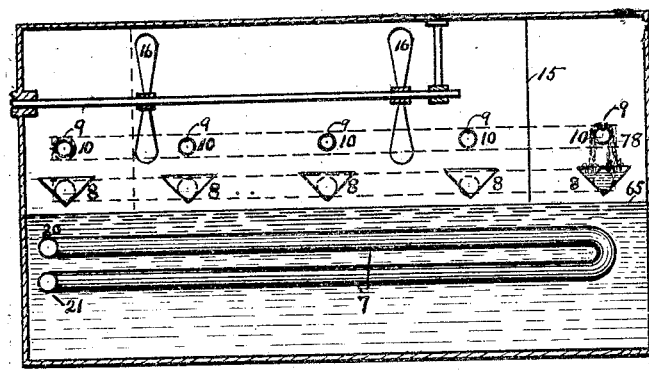
Figure 4:
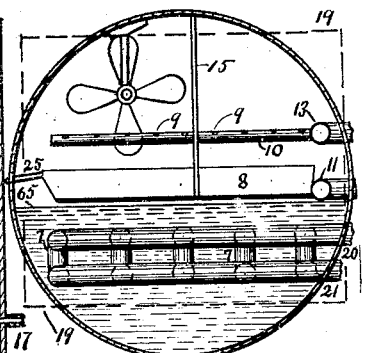
Figure 5:
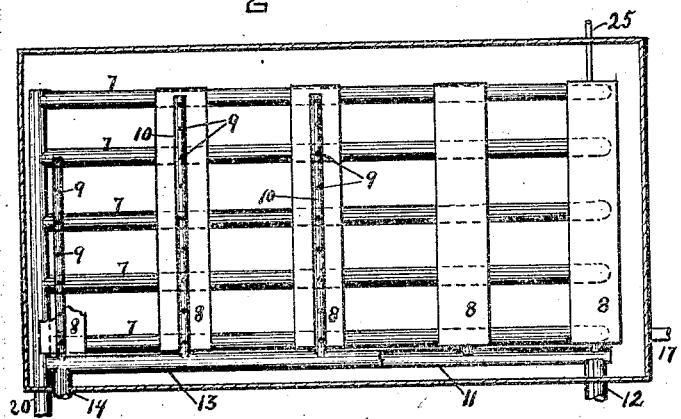
Figure 6:
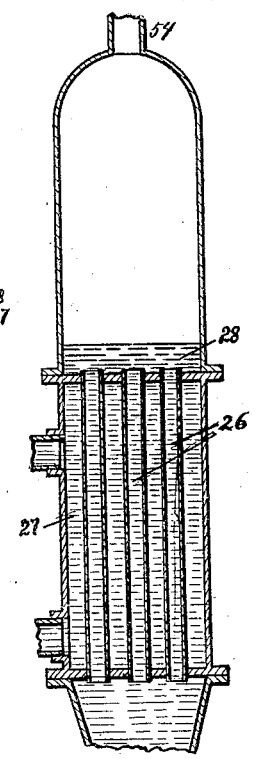

In the accompanying drawings I have shown appropriate apparatus for carrying out the process, Figure 1 illustrating the entire system in conventional arrangement. Fig. 2 is a plan of the apparatus and piping shown in Fig. 1. Figs. 3, 4, and 5, are details of the grainers and Fig. 6 is an interior view of the evaporator showing the method of adapting it to this process.

In Fig. 1, 1, is a steam boiler, 2, is an engine adapted to supply the entire motive power necessary to operate the moving or rotating pieces of mechanism. 3, is a grainer cylindrical in shape in order to better adapt it to sustain a pressure. 4, is a grainer which is not intended to carry more than a trifling amount of pressure; consequently it can be made rectangular in cross section. Although I am not going to consider that this grainer, 3, is under a pressure yet there is no reason why it will not operate at either a pressure that is somewhat above or below the pressure of the atmosphere. 5, is a grainer which is identical in every respect to grainer, 4, except that while in operation the brine it contains is at a somewhat lower temperature than the brine in the grainer, 4. Although the drawing shows the grainer, 5, to be of the same dimensions as those of the grainer, 4, yet this is not of necessity. It might be advantageous under some conditions to make the grainer 5, of considerably greater cubical contents than that of grainer, 4. 6, is an evaporator adapted to be operated under a vacuum maintained by the vacuum pump, 50, which is in communication by the pipe 52 with the condenser, 51. This condenser, 51, condenses vapor flowing into it from the evaporator through the pipe, 54, by means of the cold water jet, 58, supplied by the cold water supply 55. The condensing water is finally discharged from the condenser through the barometric tube, 56, into the hot well, 57, and from there to the sewer. The grainer, 3, is heated by the steam pipes, 7, which are fed through the connections, 63, and header, 20, with steam from either the live steam supply direct from the boiler, 1, flowing through the valve, 59, or the exhaust of the engine supplied through the valve, 60, or if required through both these supply valves at the same time. The valve, 61, permits the exhaust to be opened to the atmosphere in case it is desired to have the valve, 60, closed. The water of condensation which accumulates in the pipes, 7, flows out through the header, 21, and the connections, 62. These pipes, 7, are submerged in the brine the level of which is kept constantly at the line, 65, and is supplied at the connections, 17. Just above the level of the brine are the troughs, 8, 8, which are placed so that they will catch the falling streams of water which issue from the perforations, 9, 9, in the pipes, 10, 10. The water is taken away from these troughs, 8, 8, through connections and into the header, 11. This header, 11, delivers into the pipe, 12. The water flowing through the perforated pipes, 10, 10, is supplied from the header, 13, which is fed by the pipe, 14. A partition, 15, extends vertically from the level of the brine to the roof of the grainer but horizontally there is considerable space between the ends of the grainer and the ends of this partition in order to permit a free flow of air induced by the fan, 16, to circulate around the partition approximately in directions shown by the darts shown in Fig. 2. The lines at, 18, indicate the position of a door through which the precipitated salt can be raked out of the bottom of the grainer. A detailed description of the grainer, 4, would coincide so closely with that of the grainer, 3, that anything more than a mention of the differing features would be a superfluous repetition. The slight difference between the two grainers lies in shape of shell which is rectangular in cross section as is indicated by the dotted lines, 19, Fig. 4, and in the fan being placed sufficiently low to clear the roof of the grainer which is lower in the grainer, 4, than it is in the grainer, 3. Also the pipes, 7, are adapted to be heated by a flow of hot water instead of steam. This hot water is led from the troughs 8, 8, of grainer 3 through the header, 11, out through the pipe, 12, into the header 20 of grainer 4, and through the pipes 7, (in the grainer, 4,) back in the header, 21, and into the pipe, 22 of grainer 3, then to the centrifugal pump, 23, which forces it up through the pipe, 14, to the header 13, and then to the pipes, 10. Thus the first circuit of the water is completed. The outlets, 25, discharge the water of condensation from the circulating systems. Without this provision to get rid of the water which must necessarily accumulate while the system is in operation the troughs, 8, 8, would overflow into the brine. There is no difference whatever in the construction of the grainer, 5, as compared to the grainer, 4. The hot water drawn from the troughs, 8, 8, of the grainer, 4, is circulated by its centrifugal pump, 23, into the pipes, 7, of the grainer, 5, and the hot water drawn from the troughs of the grainer, 5, is circulated by the centrifugal pump of this same grainer through the heating space, 27, of the evaporator, 6. This hot water being of a higher temperature than the boiling brine, in the vacuum space, 28, of the evaporator, the available heat in this water is transmitted through the tubes, 26, to the boiling brine. An air compresser, 29, is so placed and so connected to the grainers, 3 and 4, that it can be used to supply air lost by leakage. A connection, 30, leading from the grainer, 5, to the condenser 51, permits of a vacuum being maintained in the grainer, 5, if so desired. The functions of the pipes, 74 and 75, correspond to those of the pipes, 12 and 22, respectively. Salt is drawn from the evaporator, 6, by closing the valve, 71, and opening the cover, 77, on the chamber, 72. At 78, Fig. 3, is indicated a spray of water dropping from a perforation, 9, in the pipe, 10, to the pan, 8. The sprays from all the perforations drop to the pans in the manner indicated by this spray, 78.

In the operation of the apparatus the pipes 14 are filled with water and pumps 23 started to force the water into pipes 10. Steam pressure in the boiler 1, is maintained preferably at about 200 lbs. The engine 2, receives the live steam at this pressure and exhausts at about 60 lbs. pressure through the valve, 60 into the steam pipes, 7, of the grainer, 3. The brine supplied to the grainer through any suitable connection is maintained constantly at the level indicated by the line, 65, the submerged steam pipes heat this brine to about 270 degrees. As 270 degrees is considerably lower than boiling point of brine at the pressure of about 50 lbs. (which is the pressure of the air compressed in the upper part of the grainer, 3) there will be no ebullition but evaporation takes place at the surface where the brine is in contact with the air. The fans 16, circulate the confined air causing the air which is now laden with aqueous vapor to flow through the spray falling from the perforated pipes, 10, 10, into the troughs, 8, 8. Obviously this spray of water condenses some of the vapor which is combined with the air and becomes heated to a temperature approaching that of the vapor. The spray is collected in the troughs and flows to the header 11, then to the pipe, 12, to the pipes, 7, of the grainer, 4. The heat absorbed at the spray is here transmitted to the brine surrounding these pipes, 7, (of the grainer, 4,) and the now somewhat cooler water is drawn through the pipe, 22, to the centrifugal pump, 23, of the grainer, 3, and is again forced through the discharge pipe, 14, to the header, 21, and then is again distributed to the perforated pipes, 10, 10, sprayed as before, heat is again absorbed and from here on the water takes the same course as already described. The heating of the brine in the grainer, 4, is accomplished by the hot circulating water in the pipes, 7, giving up some of its heat as it courses through these pipes, instead of the pipes being heated by steam as in the grainer 3, aside from this feature and the fact that the internal pressure in the grainer is about at atmospheric while the temperature is about 190 degrees the operating conditions are identically the same as are those in the grainer, 3. The same operating conditions prevail in the grainer, 5, as in the grainer 4, except that the temperature of the brine is 160 degrees. The hot circulating water issuing from the grainer, 5, flows through the pipe to and through the heating space of the evaporator 6, surrounding the tubes, 26, through which the heat is transmitted to the boiling brine in the vacuum space of this evaporator. The circulating water after giving up some of its contained heat returns by the pipe, to the centrifugal pump, 23, of the grainer, 5. The vapor from the boiling brine ascends to the condenser, 51, and is condensed, the entrained air is taken out by the vacuum pump.

I do not confine the process to operate only at the pressures and temperatures above given. There are times that a somewhat smaller grain salt is desired and again a very large grain is necessary to supply the requirements of the market. Rapid evaporation due to working with higher temperatures will tend to make the smaller grain and a low pressure and temperatures will make the larger grain. For instance, steam could be fed direct from the boiler through the valve, 59, into the pipes, 7. A higher temperature would be given to the brine, in the grainer, 3, (a higher air pressure could be carried in the grainers, 3, and 4, also) and a more rapid evaporation result. The grainers, 4 and 5 would also receive hotter circulating water with an effect of an increased rate of evaporation. The evaporator would also receive hotter circulating water from the grainer, 5. On the other hand when very large grain salt is desired the pressure and temperatures along the whole line can be lowered in proportion so that a much slower evaporation would be carried on and the production would be a much larger grain salt.

It is not necessary to use the exhaust of the engine for heating unless so desired. The boiler pressure can be carried much lower than the 200 lbs. I prefer and the exhaust of the engine discharge to atmosphere through the valve, 61. The valve, 60, is closed and live steam is fed into the pipes 7, through the valve, 59, directly from the boiler 1.

What I claim as my invention is—

1. The process of effecting a series of surface evaporations of brine at temperatures below the boiling points consisting of heating the first body of brine, evaporating in contact with air, absorbing heat from the combined air and vapor in water and utilizing the heated water to effect a second surface evaporation.

2. The process of evaporating brine consisting of effecting a surface evaporation at a pressure above atmospheric by confining air under pressure above and in contact with the surface of the body of heated brine, circulating the air and combining vapor with said air and separating the vapor from the combination by condensing.

3. The process of effecting a series of evaporations without agitation consisting of maintaining heated bodies of brine in surface contact with confined bodies of air, and absorbing heat from the first of the series to effect an evaporation in the second.

4. In the process of recovering salt from brine the effecting of a series of surface evaporations by successively heating bodies of brine which are in surface contact with air by absorbing the heat contained in the vapor rising into the air from the first body in sprays of water and then utilizing said heat by collecting said sprays into a single column of flowing water and causing same to heat a second body.

5. In the process of recovering salt from brine the effecting of a series of surface evaporations by successively heating two bodies of brine which are in surface contact with air, the air pressure in the first being higher than that in that of the second, by absorbing the heat contained in the vapor rising into the air from the first body in sprays of water and then utilizing said heat by collecting said sprays into a single column of flowing water and causing same to heat a second body.

6. In the process of recovering salt from brine the effecting of a series of surface evaporations by successively heating three bodies of brine which are in surface contact with air, the air pressure in the first being higher than that of the second and the air pressure of the second and third being the same, by absorbing the heat contained in the vapor rising into the air from the first body in sprays of water and then utilizing said heat by collecting said sprays into a single column of flowing water and causing same to heat a second body, then absorbing the heat contained in the vapor rising into the air from the second body in sprays of water and then utilizing said heat by collecting said sprays into a single column of flowing water and causing same to heat a third body.

7. The process of recovering salt from brine consisting of effecting a series of below boiling point surface evaporations by successively heating bodies of brine in surface contact with air arranged in series by causing heat absorbed from vapor arising into air from one of said bodies to be absorbed by sprays of water which are collected and then used to heat a second body of brine.

8. In the process of recovering salt from brine consisting of the following steps, effecting a lower than boiling point surface evaporation from a body of brine in surface contact with compressed air condensing the vapor arising therefrom and absorbing the heat contained therein by sprays of water, collecting said sprays of water and causing same to effect a second lower than boiling point surface evaporation from a second body of brine in surface contact with air at atmospheric pressure, condensing the vapor arising therefrom and absorbing the heat thereof by sprays of water, collecting said sprays of water and causing same to effect a third lower than boiling point surface evaporation from a third body of brine in surface contact with air at atmospheric pressure.

9. In the process of recovering salt from brine consisting of the following steps; effecting a lower than boiling point surface evaporation from a body of brine in surface contact with compressed air, condensing the vapor arising therefrom and absorbing the heat contained therein by sprays of water, collecting said sprays of water and causing same to effect a second lower than boiling point surface evaporation from a second body of brine in surface contact with air at atmospheric pressure, condensing the vapor arising therefrom and absorbing the heat thereof by sprays of water, collecting said sprays of water and causing same to effect a third lower than boiling point surface evaporation from a third body of brine in surface contact with air at atmospheric pressure condensing the vapor arising therefrom and absorbing the heat contained therein by sprays of water and causing same to effect a fourth evaporation at the boiling point due to a vacuum.

FRANK J. WOOD.

Witnesses:
MICHAEL WALSH,
CHARLES RAGGE.